(12) United States Patent
Fitzsimmons et al.

(10) Patent No.: US 10,123,084 B2
(45) Date of Patent: Nov. 6, 2018

(54) CONTEXTUAL COMMERCE FOR VIEWERS OF VIDEO PROGRAMMING

(71) Applicant: DA IP CORP., Burlingame, CA (US)

(72) Inventors: Michael R. Fitzsimmons, San Francisco, CA (US); David M. Rudnick, Denver, CO (US); Brian Joe, San Francisco, CA (US); Christopher A. Lee, Denver, CO (US); Wei Hu, Englewood, CO (US)

(73) Assignee: DA IP CORP., Burlingame, CA (US)

( * ) Notice: Subject to any disclaimer, the term of this patent is extended or adjusted under 35 U.S.C. 154(b) by 0 days.

(21) Appl. No.: 14/280,171

(22) Filed: May 16, 2014

(65) Prior Publication Data

US 2015/0020110 A1    Jan. 15, 2015

Related U.S. Application Data

(63) Continuation of application No. 13/026,074, filed on Feb. 11, 2011, now abandoned.

(51) Int. Cl.
*H04N 21/4725* (2011.01)
*H04N 21/254* (2011.01)
(Continued)

(52) U.S. Cl.
CPC ..... *H04N 21/4725* (2013.01); *G06Q 30/0257* (2013.01); *H04N 21/2542* (2013.01);
(Continued)

(58) Field of Classification Search
CPC ........... H04N 21/4725; H04N 21/2542; H04N 21/2543; H04N 21/4126; H04N 21/431;
(Continued)

(56) References Cited

U.S. PATENT DOCUMENTS

| 7,110,714 B1 * | 9/2006 | Kay ..................... H04H 20/38 |
| | | 455/158.1 |
| 7,346,563 B2 | 3/2008 | Pellerin et al. |
| | | (Continued) |

OTHER PUBLICATIONS

International Search Report, International Searching Authority, dated Apr. 18, 2012, pp. 1-23.
(Continued)

*Primary Examiner* — John Schnurr
(74) *Attorney, Agent, or Firm* — Fountainhead Law Group P.C.

(57) ABSTRACT

An apparatus and method for enabling a viewer to watch television in the usual manner, while providing the viewer with an opportunity to indicate interest in products contextually associated with, but not necessarily displayed, in the television programs viewed, are described. Viewer interest might be indicated, for example, by launching a widget from an icon located on the TV video receiver using a handheld remote controller in communication with a set-top box during the program. The program being viewed may then be identified, for example, by the selected channel, the name of the program, the episode, and the time of the selection, or a combination of these indicators. The selections are transmitted by the set-top box to a remote search server, which returns information to the viewer on a portion of the TV video receiver concerning available products contextually related to the program being viewed at the time the widget was launched by the viewer, as well as purchase information. A selected product may as well be purchased through the set-top box in communication with an e-commerce server. Use of a mobile telephone in combination with a TV set-top box for product purchasing is also described.

42 Claims, 8 Drawing Sheets

(51) Int. Cl.
*H04N 21/431* (2011.01)
*G06Q 30/02* (2012.01)
*H04N 21/2543* (2011.01)
*H04N 21/41* (2011.01)
*H04N 21/482* (2011.01)
*H04N 21/61* (2011.01)
*H04N 21/858* (2011.01)

(52) U.S. Cl.
CPC ..... *H04N 21/2543* (2013.01); *H04N 21/4126* (2013.01); *H04N 21/431* (2013.01); *H04N 21/482* (2013.01); *H04N 21/6125* (2013.01); *H04N 21/858* (2013.01)

(58) Field of Classification Search
CPC ............. H04N 21/482; H04N 21/6125; H04N 21/858; G06Q 30/0257
USPC ... 725/37, 60, 105, 109, 110, 115, 131, 139, 725/151
See application file for complete search history.

(56) References Cited

U.S. PATENT DOCUMENTS

| | | |
|---|---|---|
| 7,860,449 B1 | 12/2010 | Bowman |
| 2002/0184623 A1 | 12/2002 | Hodge et al. |
| 2005/0229227 A1 | 10/2005 | Rogers |
| 2007/0169155 A1 | 7/2007 | Pasquale et al. |
| 2008/0229353 A1 | 9/2008 | Morris et al. |
| 2009/0217317 A1 | 8/2009 | White |
| 2010/0023966 A1 | 1/2010 | Shahraray et al. |
| 2010/0306805 A1 | 12/2010 | Neumeier et al. |
| 2010/0312596 A1 | 12/2010 | Saffari et al. |

OTHER PUBLICATIONS

Supplementary Search Report dated Aug. 11, 2015, in corresponding EP Application No. 12 744 236.6.

\* cited by examiner

US 10,123,084 B2

CONTEXTUAL COMMERCE FOR VIEWERS OF VIDEO PROGRAMMING

FIELD OF THE INVENTION

The present invention relates generally to purchasing products electronically and, more particularly, to the purchase by viewers of video programming of products contextually related to a particular program.

BACKGROUND OF THE INVENTION

The use of commercials interspersed within television programs for marketing products is well known. However, such interruptions are generally perceived as annoying by viewers and, if a particular product of interest to a viewer is advertised in a commercial, the viewer will likely wait until the program is finished before further investigating this product, generally by calling a provided toll-free telephone number on a landline or mobile telephone. From the standpoint of product sales, the time delay often equates to lost sales since the viewer may no longer have an interest in the product.

Further, since the content of the commercials is determined by the advertisers, the viewer has no control over what products appear during the commercials and, in fact, may not have any interest in these products. By contrast, however, the viewer is interested in the contents of the viewer-selected program, and potentially has an interest in obtaining information concerning products related to that program.

Many products are advertised on the Internet, but unlike television commercials, advertisements displayed on a website appear on the video receiver simultaneously with the sought-after information, and do not generally prevent the viewer from viewing this information. If a viewer is interested in an advertisement, purchase may readily be achieved. Since the time spent by television viewers is generally large, TV commercials are very effective for marketing products and services.

SUMMARY OF THE INVENTION

The present invention advantageously provides an integrated television/web services or an integrated television/web services/mobile telephone contextual commercialization system.

It is an object of embodiments of the present invention to provide a method for purchasing products related to a particular TV program from a video receiver.

Another object of the invention to provide a method for purchasing products related to a particular TV program from a video receiver through the Internet during the program broadcast.

Yet another object of the invention is to provide a method for purchasing products related to a particular TV program from a video receiver and a mobile telephone.

Still another object of the invention is to provide a method for purchasing products related to a TV program from a video receiver and the recorded program.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the method for purchasing a product by a TV viewer, hereof, includes: storing metadata for at least one product linked with data contextually associated with at least one TV program on a searchable electronic database; displaying a TV program on a TV video receiver; displaying at least one widget trigger overlay on the TV video receiver; identifying TV program contextual data responsive to a widget launched by the viewer through a TV set-top box in connection with the internet during the TV program; searching the electronic database for metadata relating to the at least one product linked to the TV program contextual data; transmitting the metadata relating to the at least one linked product to the set-top box through the internet connection, whereby the at least one product is displayed on the TV video receiver; and transmitting metadata for at least one product to the set-top box through the internet connection responsive to a viewer request through the set-top box for information concerning the at least one product, whereby product metadata is displayed on the TV video receiver.

In another aspect of the invention and in accordance with its objects and purposes, the method for purchasing a product by a TV viewer, hereof, includes: storing metadata for at least one product linked with data contextually associated with at least one TV program on a searchable electronic database; displaying at least one portal on a TV video receiver; displaying a TV program on the TV video receiver responsive to a widget launched from the portal by the viewer through a TV set-top box; identifying TV program contextual data responsive to the widget launched from the portal by the viewer through the TV set-top box in communication with the internet; searching the electronic database for metadata for at least one product linked to the TV program contextual data; transmitting the metadata relating to the at least one linked product to the set-top box through the internet, whereby an icon for the at least one product is displayed on the TV video receiver; and transmitting metadata regarding at least one product to the set-top box through the Internet connection responsive to the activation of the icon by the viewer, whereby product metadata is displayed on the TV video receiver.

In yet another aspect of the invention and in accordance with its objects and purposes, the apparatus for purchasing a product by a TV viewer, hereof, includes: a television set-top box for providing television programming from a television network; an electronic database for storing product information contextually related to the television programming; a product search server in internet communication with the set-top box and in communication with the electronic database for searching for product information contextually related to the television programming responsive to television programming metadata from the set-top box; and a TV video receiver in communication with the set-top box for providing a TV display of products for purchase and product metadata contextually related to a chosen TV program.

In still another aspect of the invention and in accordance with its objects and purposes, the method for purchasing a product by a TV viewer, hereof, includes: storing metadata for at least one product linked with data contextually associated with at least one TV program on a searchable electronic database; displaying at least one portal on a TV video receiver; displaying a TV program on the TV video receiver responsive to a widget launched from the portal by the viewer through a TV set-top box; identifying TV program contextual data responsive to the widget launched from the portal by the viewer through the TV set-top box in communication with the internet; searching the electronic database for metadata for at least one product linked to the TV program contextual data; transmitting the metadata relating to the at least one linked product to the set-top box through the internet, whereby an icon for the at least one product is displayed on the TV video receiver; displaying at least one graphic overlay on the TV video receiver from the set-top box through the internet, providing mobile telephone texting instructions for purchasing at least one product contextually related to the at least one program; and providing a mobile telephone link responsive to texting instructions received from a TV viewer, whereby the at least one product is purchased by the TV viewer.

In yet another aspect of the invention and in accordance with its objects and purposes, the method for purchasing a product by a TV viewer, hereof, includes: storing metadata for at least one product linked with metadata contextually associated with at least one TV program on a searchable electronic database; displaying at least one widget trigger on a TV video receiver; displaying the at least one TV program on a TV video receiver responsive to at least one viewer widget trigger selection through an internet connection with a set-top box; identifying the TV program metadata from the at least one viewer widget trigger selection during the program; searching the electronic database for metadata relating to the at least one product linked to the at least one TV program metadata; transmitting the metadata relating to the at least one linked product to the set-top box through the internet connection, whereby the at least one product is displayed on the TV video receiver; displaying at least one graphic overlay on the TV video receiver from the set-top box through the internet, providing mobile telephone texting instructions for purchasing at least one product contextually related to the at least one program; and providing a mobile telephone link responsive to texting instructions received from a TV viewer, whereby the at least one product is purchased by the TV viewer.

In still another aspect of the invention and in accordance with its objects and purposes, the apparatus for purchasing a product by a TV viewer, hereof, includes: a television set-top box for providing television programming from a television network; an electronic database for storing product metadata contextually related to the television programming; a product search server in internet communication with the set-top box and in communication with said electronic database for searching for product metadata contextually related to the television programming responsive to television programming contextual data from the set-top box; a TV video receiver in communication with the set-top box for providing a TV display of products for purchase and product metadata contextually related to a chosen TV program, and for displaying at least one graphic overlay from the set-top box providing mobile telephone texting instructions for purchasing at least one product contextually related to the at least one program; and a mobile telephone link responsive to texting instructions received from the TV viewer over a mobile telephone.

Benefits and advantages of the present invention include, but are not limited to, providing products contextually related to a particular program requested by a viewer, including products not shown in the program, as opposed to exposing the viewer to unwanted, unrelated products, and permitting the viewer to view the products and product information on a TV video receiver after the program being viewed has finished. Moreover, the viewing, selection and purchase of the products are handled through a TV set-top box in communication with the internet, or a set-top box in communication with the internet and a mobile telephone.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1A:
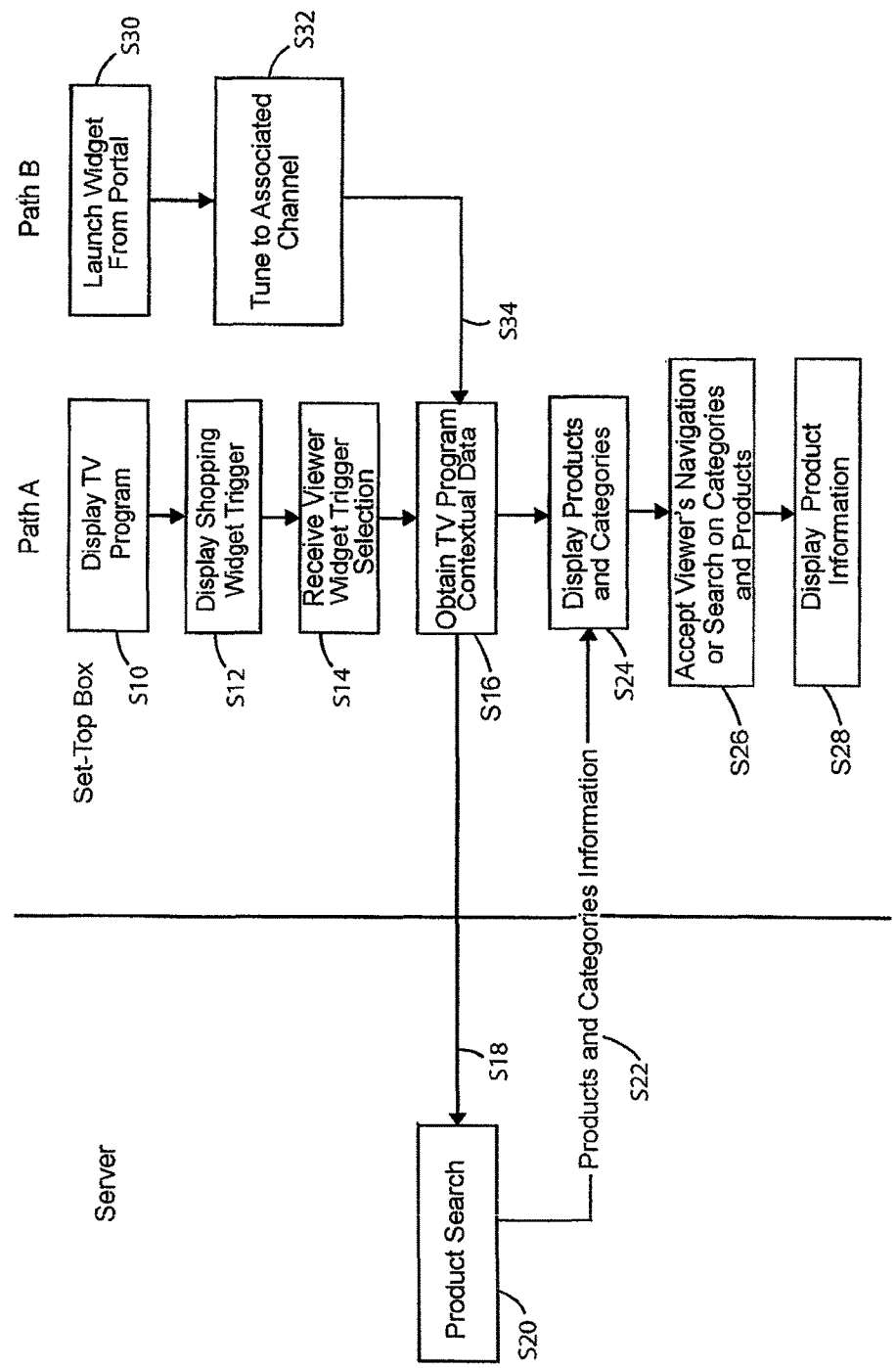
FIG. 1A is a flowchart showing an embodiment of the interaction between a viewer-operated set-top box and a remote server for presenting a TV viewer with a display of products and product information contextually related to a chosen TV program.

Briefly, embodiments of the present invention include apparatus and method for enabling a viewer to watch television in the usual manner, while providing the viewer with an opportunity to indicate interest in products contextually associated with, but not necessarily displayed, in the television programs viewed. Viewer interest might be indicated, for example, by selecting a widget trigger or icon located on the TV video receiver using a handheld remote control during the program. The program being viewed may then be identified by the selected channel, the name of the program, the episode, and the time of the selection, as examples, or a combination of these indicators. The selections are transmitted by the set-top box to a remote server, which returns information to the viewer on a portion of the TV video receiver concerning available products contextually related to the program being viewed at the time the widget trigger selections were made by the viewer, as well as purchase information. Purchases of products selected by the viewer may be made through the set-top box in communication with an e-commerce server.

Programs may be recorded using a Digital Video Recorder (DVR), as an example, in which case program information provided to the set-top box with the program is sent to the remote server once a widget trigger selection by the viewer is made.

A viewer may also select a widget trigger from the set-top box or displayed on the television video receiver or other video receiver from which an associated channel identifying various programs for which products are available for purchase is displayed on the viewer's television video receiver, and from which the viewer may select a program for viewing using the remote control, as an example. Activation of other widget triggers displayed on the TV video receiver along with the program would permit the viewer to locate products associated with that program, as described hereinabove, or the available, contextually associated products might be simultaneously displayed along with the TV program on different portions of the TV video receiver.

Contextually related products are again identified by a database in communication with the server, and such products may be displayed on the viewer's TV video receiver, along with other information, including purchase information, through the set-top box. Purchase of particular products may be achieved through the set-top box, and further through which the viewer can be identified by viewer account information.

In another embodiment of the invention, once the widget displayed on the TV video receiver is selected, the viewer may use a mobile telephone in place of the set-top box to send a text message to a link identified in the widget. The viewer may then receive a text message containing another link. The viewer's mobile telephone number and account identification information is provided through this second link, and the checkout process may be completed on the viewer's mobile telephone.

DEFINITIONS/GLOSSARY

Prior to a detailed description of embodiments of the invention, the following definitions are provided as an aid to understanding the subject matter and terminology thereof. Such definitions are not intended to limit the invention as set forth in the claims.

API: Application Protocol Interface.

Contextual Commerce or Commercialization: Querying metadata and product sourcing APIs to return a list of assets that are directly related to a television (TV) program.

EPG/IPG: Electronic Program Guide/Interactive Program Guide.

Portal: Collection of widgets in an overlay.

Product: Goods and services.

Remote: Not on set-top box.

Set-Top Box: An electronic device connected to a medium of signal transmission, for receiving electronic signals corresponding to television programs and converting the signals into a form for display on a monitor, typically associated with a cable television (CATV) system or a satellite system; that functionality could be integrated into a television set, and therefore need not be a separate box therefrom.

SKU: Stock-Keeping Unit or unique identifier for each distinct product and service that can be purchased or otherwise obtained.

TPCD: TV Program Contextual Data which includes, but is not limited to EPG.

Trigger: A broadcast message that provides a synchronous mechanism to an interactive TV application. Triggers may be embedded in the associated video program, or delivered via another means such as the out-of-band. Triggers may also be used for the delivery of unsolicited data to an application, and may include application signals and stream events.

TV program includes, but is not limited to: broadcast, a linear or non-linear (VoD) programming Network, a Program, a Specific Program Episode, or Special Event.

TV program metadata: TV program contextual data to be associated with products to be purchased.

Video Receiver: Electronic video viewing device, including video viewing devices capable of receiving and decoding broadcast linear and nonlinear video signals.

VoD: Video on demand.

Widget: Software application accessible by a set-top box running on a video receiver.

Widget Trigger or Icon on Video Receiver: Widget initiator or entry point accessible by a viewer using a remote controller from a menu, an advertisement, or a portal, as examples, on a TV video receiver.

Reference will now be made in detail to the present preferred embodiments of the inventions, examples of which are illustrated in the accompanying drawings. In the Figures, similar or identical steps will be identified using identical callouts. Turning now to FIG. 1A, a flowchart showing an embodiment of the interaction between a viewer-operated set-top box and a remote server for presenting a TV viewer with a display of products and product information contextually related to a chosen TV program is illustrated. In designated "Path A" of FIG. 1A, a chosen program is displayed and viewed, S10, by the TV viewer. For example, Comcast or Direct-TV might deliver the audio and video portions of CNN to the viewer's set-top box, in addition to metadata relating to that program. For programs or episodes of programs for which products are available, one or more shopping widget trigger overlays along with the TV program are displayed, S12, on the TV video receiver. The overlays contain information or provide instructions for the viewer, and may be periodically displayed every 30 minutes, as an example. A viewer may choose to purchase a product related to the show being presented by pressing or clicking a remote controller key, as an example. This action by the viewer launches, S14, the associated widget through the set-top box. TV Program Contextual Data is obtained, S16, by the set-top box and provided to the remote server, S18 through the internet. A product search, S20, is then performed by the remote server, and products and categories information are provided by the server, S22, to the viewer through the set-top box as a display, S24, on the TV video receiver, as an example. In keeping with these identifications, a sport series is treated as a program, while a sport game is treated as an episode.

A product or products chosen by a viewer using the set-top box after navigating or searching categories and products is received by the set-top box, S26, which displays product information for the viewer, S28, on the TV video receiver. This method is applicable to both live and recorded programming.

In another embodiment of the invention, designated as "Path B" of FIG. 1A, a viewer selects, S30, a widget by choosing one of the widget trigger overlays from a portal on the viewer's TV video receiver provided by the set-top box, using a remote controller, as an example. The TV is then tuned, S32, by the set-top box to a channel corresponding to or associated with the widget trigger selected, and the set-top box is directed, S34, by the widget to obtain TV Program Contextual Data, which is then directed, S18, to the remote server where a product search S20 is performed. Any products and categories located are displayed, S24, as an example, on the TV video receiver alongside the TV program running on the associated channel. This procedure is applicable only for live programs.

Figure 1B:
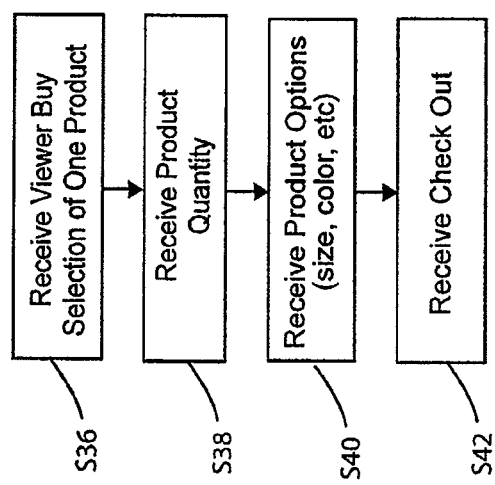
FIG. 1B is a flowchart illustrating an embodiment of the invention where a viewer, once having chosen a particular product, proceeds to checkout.

FIG. 1B is a flowchart illustrating an embodiment of the invention where a viewer, once having chosen a particular product, proceeds to checkout. The viewer provides the product selection, the product quantity, and the product options, such as size, color, etc., and the check out command, using the set-top box in steps S36, S38, S40, and S42, respectively, as an example.

Figure 1C:
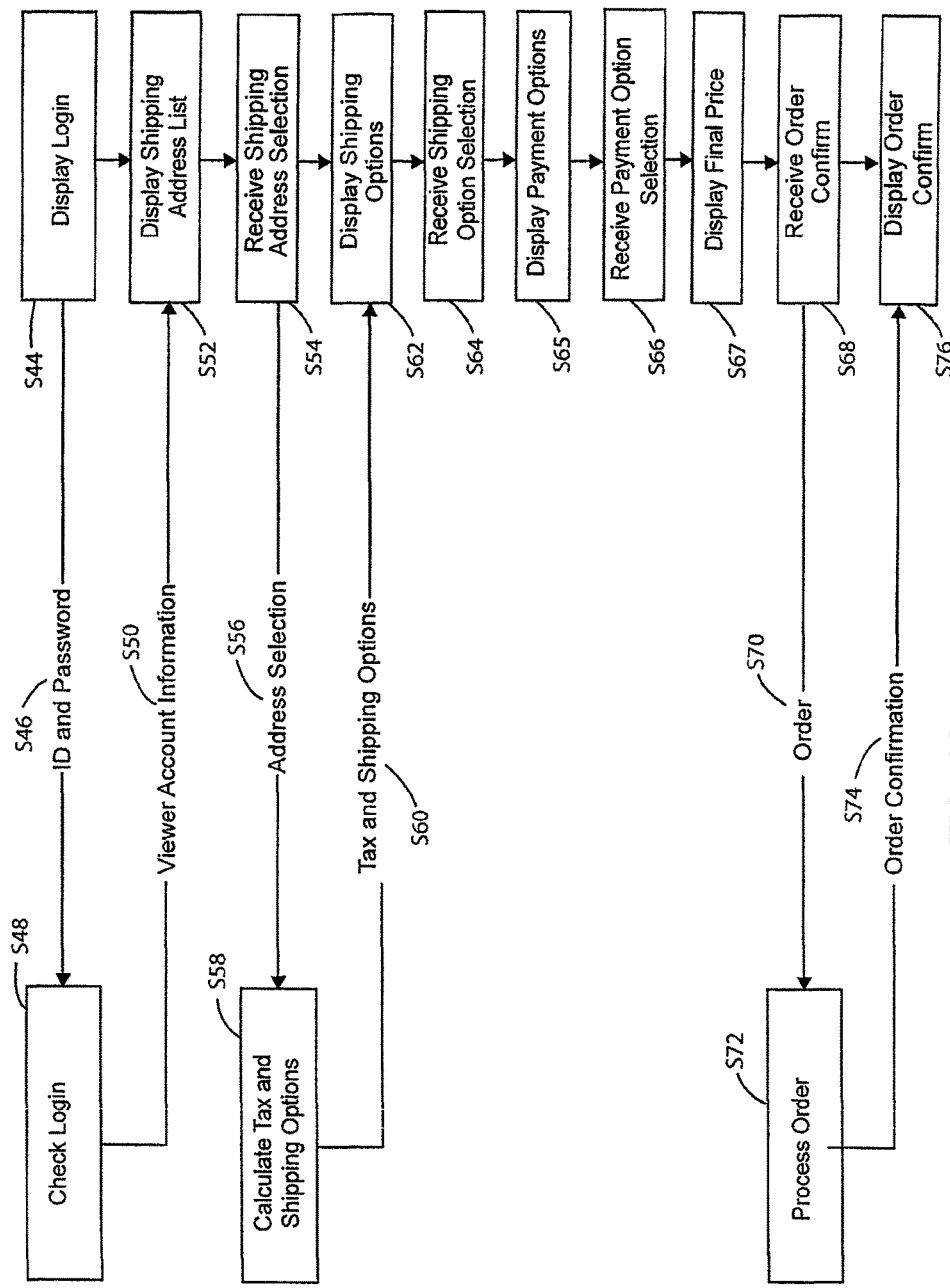
FIG. 1C is a flowchart showing an embodiment of the invention where a viewer having proceeded to checkout may arrange for electronic payment of the purchase.

FIG. 1C is a flowchart showing an embodiment of the invention where a viewer having proceeded to checkout may arrange for electronic payment thereof. After receiving the check out command S42, the set-top box displays a viewer login request on the TV video receiver, S44. The viewer enters his or her identification number and password, S46, which is sent to the remote server which verifies the viewer login, S48. In this manner, the viewer/customer can be identified from all of the viewers of a particular program on the TV video receiver. Viewer account information is sent by the server, S50, to the set-top box, where the viewer's shipping address list is displayed, S52, by the set-top box on the TV video receiver. The viewer elects his or her shipping address form a shipping address list on the set-top box, S54, from where it is transmitted, S56, to the remote server. The server calculates, S58, the viewer's tax and shipping options, and sends this information, S60, to the set-top box where it is displayed by the set-top box, S62, on the TV video receiver. The viewer then selects a shipping option, S64, using the set-top box. In response, the TV set-top box displays the payment options, S65, on the TV video receiver. After receiving a selection of the selected payment option from the viewer, S66, the set-top box causes the final price to be displayed on the TV video receiver, S67. The viewer may then confirm the order on the set-top box, S68, which is sent, S70, to the remote server, where it is processed, S72. An order confirmation is sent by the server, S74, to the set-top box where it is displayed, S76, on the TV video receiver.

As stated hereinabove, but not shown in FIG. 1, the viewer may use a mobile telephone in place of the set-top box to send a text message to a link identified in the widget. The viewer may then receive a text message containing another link. The viewer's mobile telephone number and account identification information is provided through this second link, and the checkout process may be completed on the viewer's mobile telephone.

Figure 2:
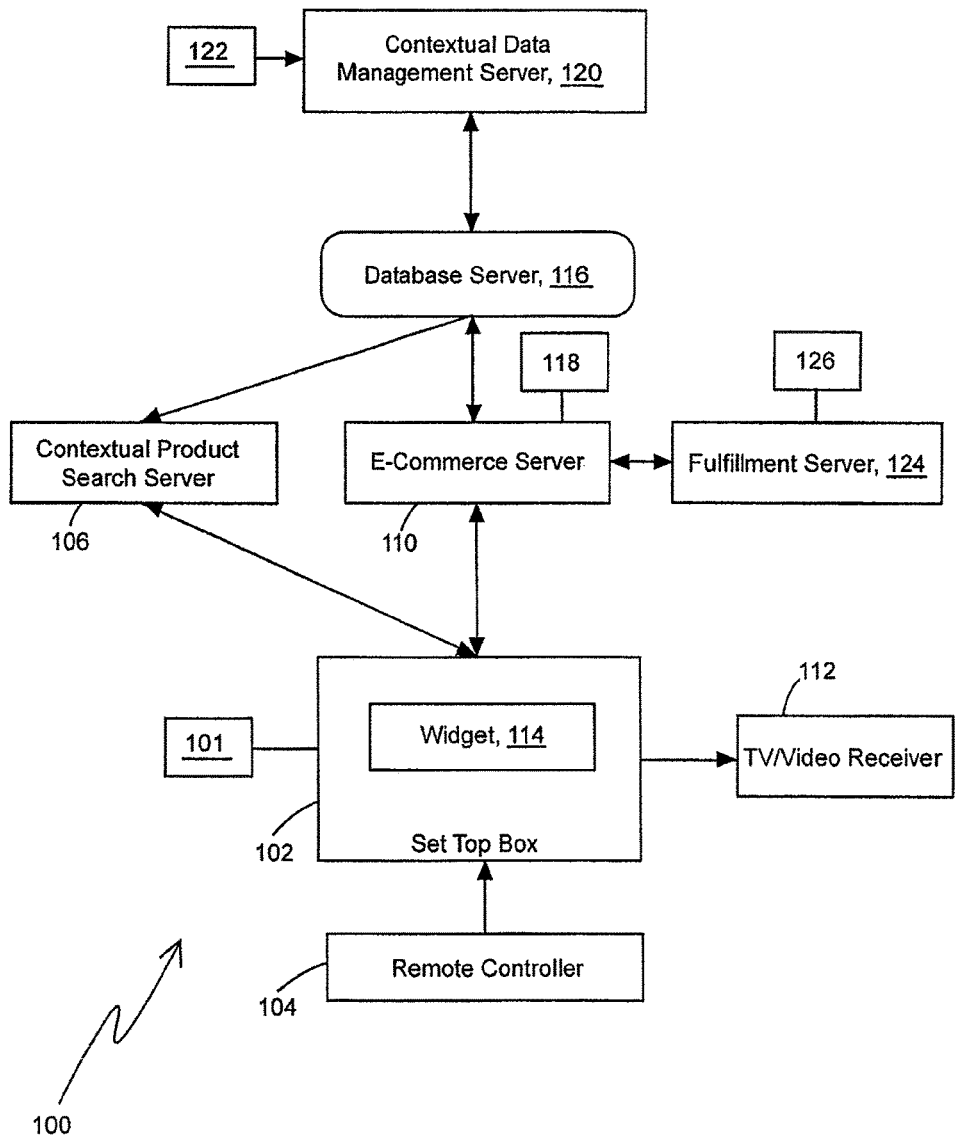
FIG. 2 is a schematic representation of an embodiment of an apparatus including a viewer-operated set-top box and remote servers for presenting a TV viewer with a TV display of products and product information contextually related to a chosen TV program for purchase, as set forth in FIGS. 1A-1C, hereof.

FIG. 2 is a schematic representation of an embodiment of apparatus, 100, including network provider, 101, for providing television programming to set-top box, 102, operated by a viewer using remote controller, 104, as an example, for communicating with remote contextual product search server, 106, and e-commerce server, 110, for presenting a TV viewer with a TV display, 112, of products and product information contextually related to a chosen TV program for purchase, as set forth in FIGS. 1A-1C, hereof. Set-top box 102 receives and displays the TV program, provides a platform for the widget software, 114, to execute and access television program contextual data (TCPD) in response to viewer commands from remote controller 104. Contextual Product Search Server 106 receives the TV program information from widget software 114 after the widget is activated by the viewer, and requests product information from Database Server, 116, containing a non-transitory computer-readable database medium, based on the TPCD which is then transmitted to Contextual Product Search Server 106 and subsequently to set-top box 102 for display on TV video receiver 112. Similar TV program information would be provided to Contextual Product Search Server 106 in the situation where the program was recorded (apparatus not shown in FIG. 2). Once a product selection is made by a viewer/purchaser on set-top box 102, widget software 114 transmits this choice to E-commerce Server 110 which manages the product sales and directs the storage of viewer/purchaser, e-commerce transaction and order information in database server 116. Management of viewer websites, checking on product shipment status, and interaction with viewer/purchasers as examples, on E-commerce Server 110 may be directed by an operator through console, 118, as an example.

Database Server 116 controls the storage of product data, the TPCD, user information, e-commerce transaction information, and order information contained in a database. Contextual Data Management Server, 120, manages the TPCD information directed to Database Server 116, and constructs linkages among the TPCD and products from information provided in part from, and updated by a third party through port or console, 122. An example would be EPG information provided by Tribune Media Service, Inc. (TMS). Fulfillment Server, 124, controls the process of delivering orders to a viewer/purchaser. Orders might be entered by through console, 126, in some embodiments.

Figure 3:
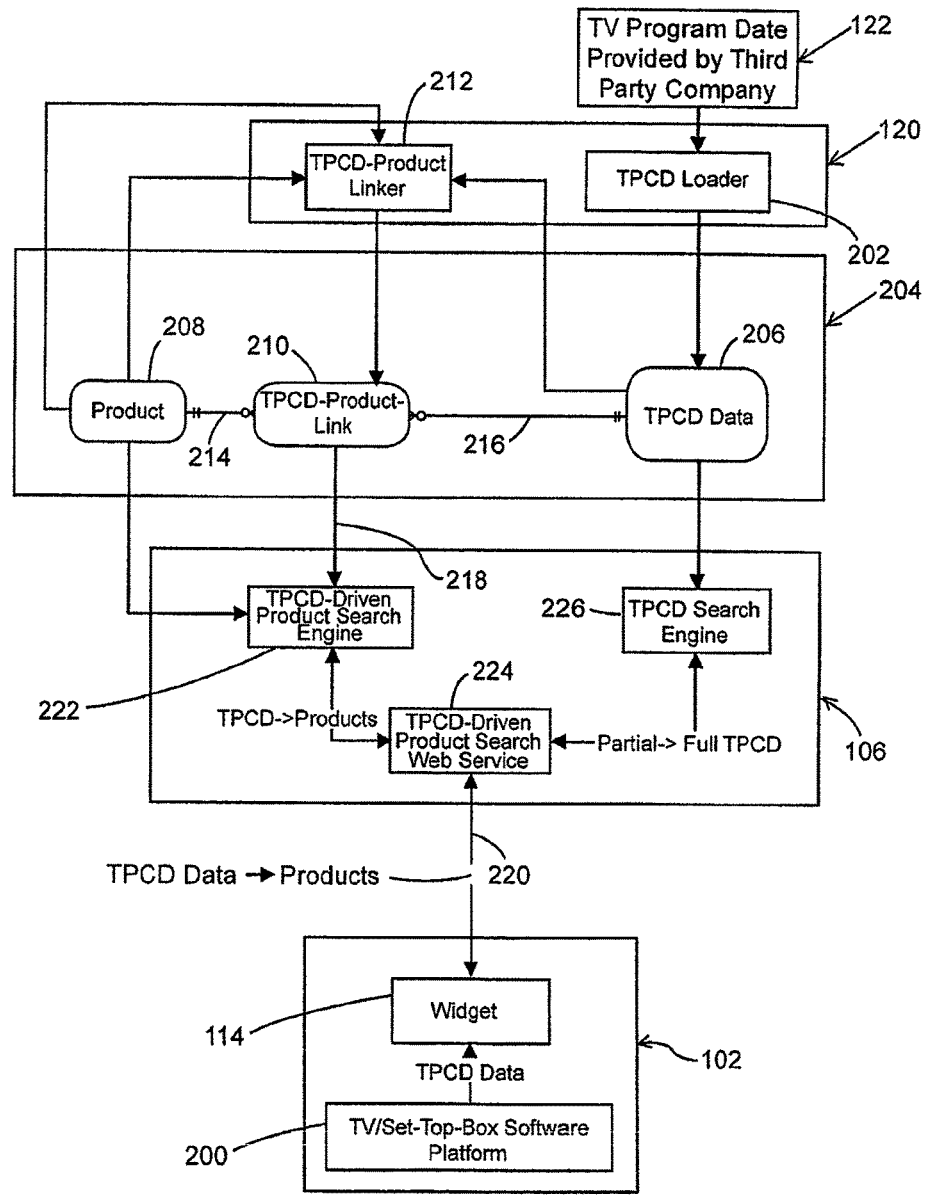
FIG. 3 is a schematic representation of an embodiment of the interaction among hardware and software packages within several of the apparatus components illustrated in FIG. 2 hereof.

FIG. 3 is a schematic representation of an embodiment of the interaction among hardware and software packages within several of the apparatus components illustrated in FIG. 2 hereof. Set-top box 102 includes TV/Set-Top-Box Software Platform, 200, which permits widget software 114 to operate. Third-party supplied TV programming data (EPG) is input into TPCD loader, 202, of Contextual Data Management Server 120 through apparatus 122. Television Program Contextual Data (TPCD) contains EPG as well as other information, as will be described hereinbelow. The TPCD is loaded into electronic Product and TPCD Database, 204, which is included in Database Server 116 (FIG. 2), which stores TPCD data, 206, Product metadata, 208, and linked TPCD-Product data, 210, derived from TPCD-Product Linker, 212 in Contextual Data Management Server 120. Arrows, 214, and 216, indicate, for example, that an item in the product database may be linked to several elements of TPCD, and an element of TPCD may be linked to several products, respectively, as will be further described hereinbelow. Arrows similar to arrows, 218, and 220, indicate that data flows from TPCD-Product Link database to the TPCD-Driven Product Search Engine, 222, in Contextual Product Search Server 106, and between Set-top Box 102 and TPCD-Driven Product Search Web Service, 224, respectively, arrow 220 being double-headed indicating data flow in both directions.

In an exemplary demonstration of an embodiment of the present invention, widget 114 is activated by a viewer, and TPCD data generated by Set-top box 102 is transmitted to TPCD-Driven Product Search Web Service 224 in Contextual Product Search Server 106. Television Program Contextual Data Search Engine, 226, is queried by Web Service 224 to locate additional TPCD information, after which Web Service 224 requests product information from TPCD-Driven Product Search Engine 222, and relates the product information to Set-top Box 102 where it can be viewed and certain products selected for purchase by a viewer/purchaser.

Figure 4:
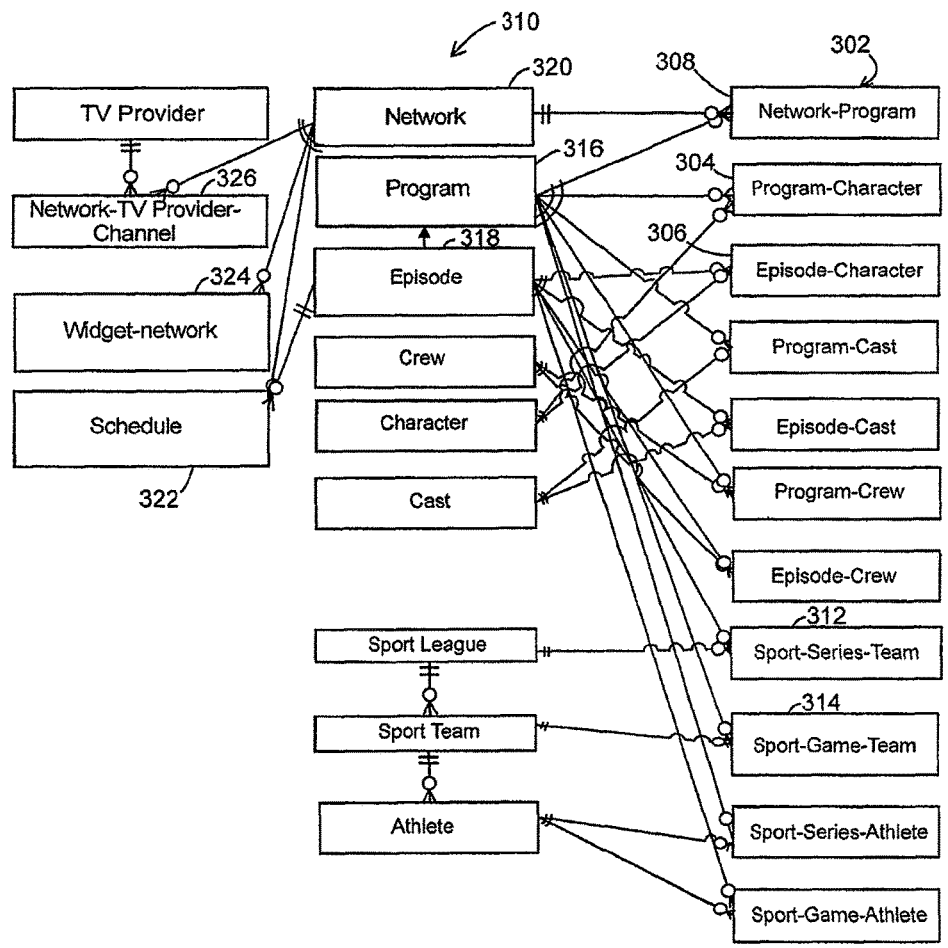
FIG. 4 shows relationships among several exemplary pieces of information for generating television program contextual data.

FIG. 4 shows the combination of several exemplary pieces of information for generating television program contextual data. As examples, Col., 302, illustrates the linking of a TV program or episode with one or more characters therein, as, 304, and 306, respectively, with a network, 308, or with other information found in col. 310, to form TPCD. A sport series is treated as a program, while a game is treated as an episode. A program, 316, may include shows, movies, or sport series, as examples. Network information, 320, may include the program schedule, 322, a particular widget number, 324, or a channel number, 326, provided by a TV provider, or all of these pieces of information, as examples.

TABLES 1-6 are provided to illustrate prophetic relationships among the various data sets. In the TABLES, the identifiers set forth are simply examples provided for ease of understanding.

TABLE 1

(Network Table)

| Network Identifier | Network Name |
| --- | --- |
| 1 | HBO |
| 2 | NBC |
| 3 | ABC |
| 4 | DISCOVERY |

TABLE 2

(Program Table)

| Program Identifier | Program Name |
| --- | --- |
| 1 | Big Love |
| 2 | True Blood |
| 3 | Rome |
| 4 | Cash Cab |
| 5 | Brew Master |
| 6 | Dirty Jobs |

TABLE 3

(Network-Program Table (M-N Relationship))

| Network Identifier | Program Identifier |
| --- | --- |
| 1 | 1 |
| 1 | 2 |
| 1 | 3 |
| 2 | 1 |
| 2 | 5 |
| 2 | 6 |

From TABLE 3, it may be seen that one network can have several programs, and that one program can belong to several networks. The values in the Network Identifier column derive from the Identifiers in the Network Table, while the values in the Program Identifier column derive from the Program Table.

TABLE 4

(Episode Table (1-N relationship))

| Episode Identifier | Episode | Program Identifier |
| --- | --- | --- |
| 1 | Pilot | 1 |
| 2 | Viagra Blue | 1 |
| 3 | Mine | 1 |
| 4 | Home Invasion | 2 |
| 5 | Sparks Fly Out | 2 |
| 6 | Cold Ground | 2 |

It is to be noted that one episode can belong to only one program, but one program may have several episodes.

TABLE 5

(Product Table)

| Product Identifier | Name | Price ($) |
| --- | --- | --- |
| 1 | True Blood: The Complete Second Season DVD | 47.99 |
| 2 | True Blood Beverage - 4 Pack | 16.00 |
| 3 | Big Love: Season Four DVD | 59.99 |
| 4 | Big Love Logo Speckled Mug | 12.99 |

TABLE 6

(Program-Product Table)

| Product Identifier | Program Identifier |
| --- | --- |
| 1 | 2 |
| 2 | 2 |
| 3 | 1 |
| 4 | 1 |

Figure 5:
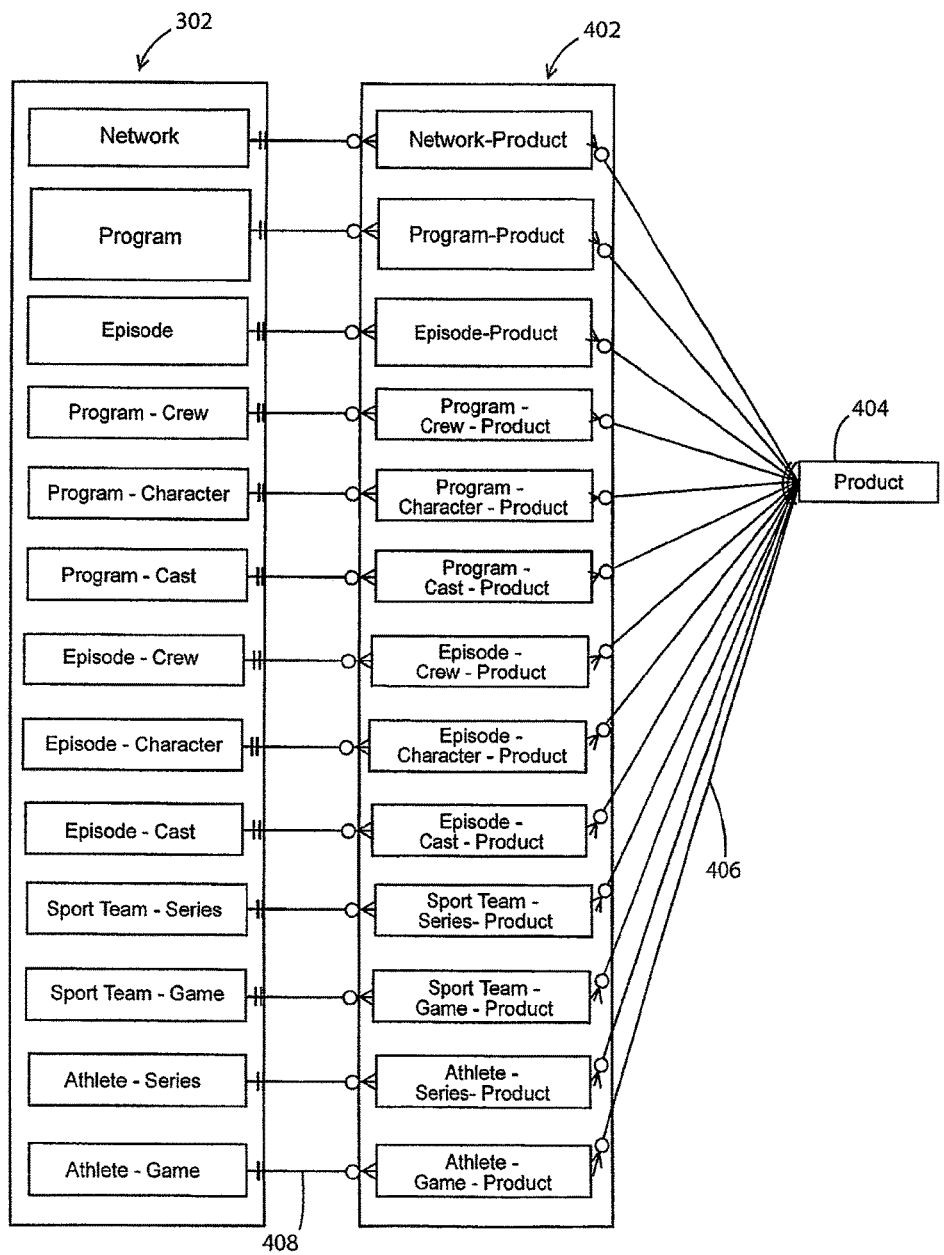
FIG. 5 shows relationships among several exemplary pieces of information for linking television program contextual data with products.

FIG. 5 illustrates several exemplary pieces of contextual information from FIG. 4 hereof, for linking TPCD with products. Column, 402, shows examples linking TPCD, 302, with products, 404. As an example, arrows, 406, and 408, show that one program can be linked to several products, and that a particular product 404 may be linked with several games and athletes.

Figure 6:
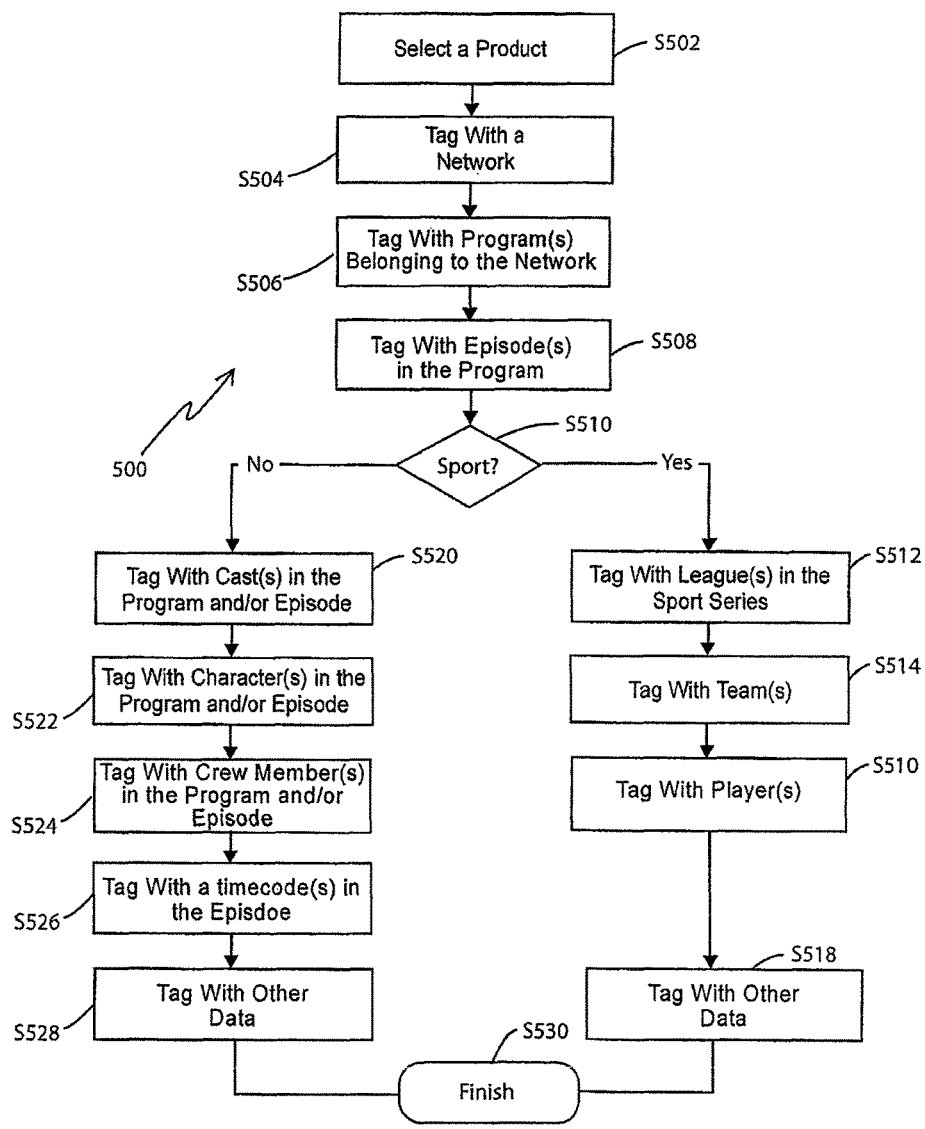
FIG. 6 is a flowchart illustrating an embodiment of the process for tagging a product with metadata from several example elements of television program contextual data selected from FIG. 4 hereof.

FIG. 6 is a flowchart illustrating an embodiment of process, S500, for tagging a product with metadata from several example elements of television program contextual data selected from FIG. 4 hereof. A product is selected, S502, linked with network information, S504, program information, S506, and episode information, S508. A determination is then made as to whether a sport is involved, S510. If yes, the product is further linked with a league, S512, a team, S514, and players, S516, and perhaps other information, S518. As stated hereinabove, a sport series is treated as a program, and a sport game is treated as an episode. If no sport is involved, the product is linked with the cast in the program and/or episode, S520, with the characters in the program and/or episode, S522, with the crew members of the show and/or episode, S524, a time code in the episode, and perhaps with other information, S526, before the process is completed, S530.

Having generally described the present method, more details thereof are presented in the following EXAMPLES.

Example 1

TV Wallet

TV Wallet is a web-based, profile management system that provides a simple and convenient way for customers to complete a one-time registration profile permitting TV shopping for products using a phone number and PIN. The TV Wallet is a secure registration repository of customer profile data that includes, but is not limited to: (1) Profile Creation; (2) Payment Method Setup; (3) Shipping Address Setup; and (4) Profile Preferences Setup.

(1) Profile creation: First name, Last name, Email, Mobile Phone Number (or landline, if no mobile number), PIN, PIN Hint, pay TV Services provider (e.g. Verizon, AT&T, Comcast, etc.)

(2) Payment Method Setup: Credit/Debit Card type, as an example, Cardholder Name, Card number, Card expiration, CSC security code, Address 1, Address 2, City, ST, Zip Code. The system supports set up of multiple debit/credit cards and other payment options.

(3) Shipping Options Setup: Full name, Address 1, Address 2, Phone Number (optional), City, ST, Zip Code. The system supports multiple Shipping Addresses.

(4) Profile Preferences Setup: Contact preferences, Content preferences, Application preferences, Affinity/Loyalty programs, etc.

Once registered, customers can undertake transactions on TV, Mobile, even Online—using only a phone number (mobile or landline) and a numeric TV Wallet PIN to authenticate their purchase. Customers can also actively manage their TV Wallet profile online—add/delete payment options and shipping addresses, view purchase history, track current orders, request a PIN, set/manage preferences, browse FAQ's and contact customer service.

Example 2

Mobile Telephone Purchases

During a TV program, a registered TV Wallet viewer/customer notices a graphic overlay appear on-screen: "Text 'BuyNow' to 12345 to purchase Season 1 of The Program on DVD." Using a mobile telephone, the viewer sends the text and receives a message containing a link. The viewer clicks the link, enters his Mobile Telephone Number and TV Wallet PIN and completes the checkout process on the mobile telephone.

Example 3

TV Purchases

During a TV program, a registered TV Wallet viewer/customer notices a small graphic appear on-screen reciting: "Shop Now for The Program". The viewer selects OK on a remote controller and can view the live video feed along with the shopping application on the TV video receiver. The viewer observes that there are one or more "Program" products to choose from, and decides to purchase the Season 1 DVD Set, as an example. Again, using the TV remote controller, the viewer enters the application using his TV Wallet credentials using his registered phone number (mobile or landline) and TV Wallet PIN (as an authenticated user or purchaser), and follows the on-screen purchase sequence to complete checkout.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
    generating television (TV) program contextual data for a plurality of TV programs such that the TV program contextual data is related to, but not presented in, at least one TV program;
    storing the TV program contextual data in a searchable electronic product and Television Program Contextual Data (TPCD) database included on an electronic database server;
    selecting a product associated with product metadata;
    linking the product metadata with a program via first linked metadata;
    determining whether a sport is involved based on the program;
    when the program is not associated with the sport, linking the product metadata with cast, character, or crew contextual data via second linked metadata;
    when the program is associated with the sport, linking the product metadata with team or player contextual data via third linked metadata;
    storing the first linked metadata, the second linked metadata, and the third linked metadata in the product and TPCD database;
    displaying a TV program in the plurality of TV programs on a TV video receiver;
    displaying at least one widget trigger overlay on the TV video receiver;
    identifying an element of TV program contextual data for the TV program responsive to a widget launched by a TV viewer through a TV set-top box in connection with the Internet during the display of the TV program;
    selecting product metadata for the product using one of the first linked metadata, the second linked metadata, and the third linked metadata that is stored in the product and TCPD database; and
    transmitting the product metadata relating to the product to the set-top box through the Internet connection, whereby the product metadata of the product is displayed on the TV video receiver.

2. The method of claim 1, wherein linking the product metadata with the program via first linked metadata comprises:
    tagging the product with a network;
    tagging the product with the program belonging to the network; and
    tagging the product with one or more episodes in the program.

3. The method of claim 2, wherein determining whether the sport is involved based on the program comprises:
    determining whether the network, the program, or the one or more episodes is associated with the sport.

4. The method of claim 2, wherein linking the product metadata with the cast, character, or crew via second linked metadata comprises performing one or more of:
    tagging the product with one or more casts in the program or an episode in the one or more episodes;
    tagging the product with one or more characters in the program or episode in the one or more episodes; and
    tagging the product with one or more crew members in the program or episode in the one or more episodes.

5. The method of claim 4, wherein linking the product metadata with the cast, character, or crew via second linked metadata comprises:

tagging the product with one or more timecodes in the episode.

6. The method of claim 4, wherein identifying the element of TV program contextual data for the TV program comprises:
receiving one or more of the one or more casts, the one or more characters, and the one or more crew members; and
identifying the product via the second linked metadata.

7. The method of claim 2, wherein linking the product metadata with the team or player via third linked metadata comprises performing one or more of:
tagging the product with one or more leagues in a sport series;
tagging the product with one or more teams in the sport series; and
tagging the product with one or more players in the sport series.

8. The method of claim 7, wherein identifying the element of TV program contextual data for the TV program comprises:
receiving one or more of the one or more leagues, the one or more teams, and the one or more players; and
identifying the product via the third linked metadata.

9. The method of claim 2, wherein identifying the element of TV program contextual data for the TV program comprises:
receiving one or more of the network, the program, and the one or more episodes; and
identifying the product via the first linked metadata.

10. The method of claim 1, wherein widget comprises a TV overlay.

11. The method of claim 1, further comprising:
receiving a selection of the product for purchase; and
processing the purchase.

12. The method of claim 11, wherein processing the purchase comprises:
receiving a quantity of the product to be purchased;
receiving selected options for the product from the TV viewer;
receiving TV viewer account information; and
receiving a checkout request from the TV viewer.

13. The method of claim 11, wherein receiving the selection comprises:
receiving the selection from a mobile telephone link responsive to texting instructions received from the TV viewer over a mobile telephone.

14. The method of claim 11, wherein receiving the selection comprises:
receiving the selection from a remote control for the set-top box or the TV.

15. A non-transitory computer-readable storage medium containing instructions, that when executed, control a computer system to be configured for:
generating television (TV) program contextual data for a plurality of TV programs such that the TV program contextual data is related to, but not presented in, at least one TV program;
storing the TV program contextual data in a searchable electronic product and Television Program Contextual Data (TPCD) database included on an electronic database server;
selecting a product associated with product metadata;
linking the product metadata with a program via first linked metadata;
determining whether a sport is involved based on the program;
when the program is not associated with the sport, linking the product metadata with cast, character, or crew contextual data via second linked metadata;
when the program is associated with the sport, linking the product metadata with team or player contextual data via third linked metadata;
storing the first linked metadata, the second linked metadata, and the third linked metadata in the product and TPCD database;
displaying a TV program in the plurality of TV programs on a TV video receiver;
displaying at least one widget trigger overlay on the TV video receiver;
identifying an element of TV program contextual data for the TV program responsive to a widget launched by a TV viewer through a TV set-top box in connection with the Internet during the display of the TV program;
selecting product metadata for the product using one of the first linked metadata, the second linked metadata, and the third linked metadata that is stored in the product and TCPD database; and
transmitting the product metadata relating to the product to the set-top box through the Internet connection, whereby the product metadata of the product is displayed on the TV video receiver.

16. The non-transitory computer-readable storage medium of claim 15, wherein linking the product metadata with the program via first linked metadata comprises:
tagging the product with a network;
tagging the product with the program belonging to the network; and
tagging the product with one or more episodes in the program.

17. The non-transitory computer-readable storage medium of claim 16, wherein determining whether the sport is involved based on the program comprises:
determining whether the network, the program, or the one or more episodes is associated with the sport.

18. The non-transitory computer-readable storage medium of claim 16, wherein linking the product metadata with the cast, character, or crew via second linked metadata comprises performing one or more of:
tagging the product with one or more casts in the program or an episode in the one or more episodes;
tagging the product with one or more characters in the program or episode in the one or more episodes; and
tagging the product with one or more crew members in the program or episode in the one or more episodes.

19. The non-transitory computer-readable storage medium of claim 18, wherein linking the product metadata with the cast, character, or crew via second linked metadata comprises:
tagging the product with one or more timecodes in the episode.

20. The non-transitory computer-readable storage medium of claim 18, wherein identifying the element of TV program contextual data for the TV program comprises:
receiving one or more of the one or more casts, the one or more characters, and the one or more crew members; and
identifying the product via the second linked metadata.

21. The non-transitory computer-readable storage medium of claim 16, wherein linking the product metadata with the team or player via third linked metadata comprises performing one or more of:
tagging the product with one or more leagues in a sport series;

tagging the product with one or more teams in the sport series; and tagging the product with one or more players in the sport series.

22. The non-transitory computer-readable storage medium of claim 21, wherein identifying the element of TV program contextual data for the TV program comprises:

receiving one or more of the one or more leagues, the one or more teams, and the one or more players; and identifying the product via the third linked metadata.

23. The non-transitory computer-readable storage medium of claim 16, wherein identifying the element of TV program contextual data for the TV program comprises:

receiving one or more of the network, the program, and the one or more episodes; and identifying the product via the first linked metadata.

24. The non-transitory computer-readable storage medium of claim 15, wherein widget comprises a TV overlay.

25. The non-transitory computer-readable storage medium of claim 15, further comprising:

receiving a selection of the product for purchase; and processing the purchase.

26. The non-transitory computer-readable storage medium of claim 25, wherein processing the purchase comprises:

receiving a quantity of the product to be purchased;

receiving selected options for the product from the TV viewer;

receiving TV viewer account information; and receiving a checkout request from the TV viewer.

27. The non-transitory computer-readable storage medium of claim 25, wherein receiving the selection comprises:

receiving the selection from a mobile telephone link responsive to texting instructions received from the TV viewer over a mobile telephone.

28. The non-transitory computer-readable storage medium of claim 25, wherein receiving the selection comprises:

receiving the selection from a remote control for the set-top box or the TV.

29. An apparatus comprising:

one or more computer processors; and a non-transitory computer-readable storage medium comprising instructions, that when executed, control the one or more computer processors to be configured for:

generating television (TV) program contextual data for a plurality of TV programs such that the TV program contextual data is related to, but not presented in, at least one TV program;

storing the TV program contextual data in a searchable electronic product and Television Program Contextual Data (TPCD) database included on an electronic database server;

selecting a product associated with product metadata;

linking the product metadata with a program via first linked metadata;

determining whether a sport is involved based on the program;

when the program is not associated with the sport, linking the product metadata with cast, character, or crew contextual data via second linked metadata;

when the program is associated with the sport, linking the product metadata with team or player contextual data via third linked metadata;

storing the first linked metadata, the second linked metadata, and the third linked metadata in the product and TPCD database;

displaying a TV program in the plurality of TV programs on a TV video receiver;

displaying at least one widget trigger overlay on the TV video receiver;

identifying an element of TV program contextual data for the TV program responsive to a widget launched by a TV viewer through a TV set-top box in connection with the Internet during the display of the TV program;

selecting product metadata for the product using one of the first linked metadata, the second linked metadata, and the third linked metadata that is stored in the product and TCPD database; and transmitting the product metadata relating to the product to the set-top box through the Internet connection, whereby the product metadata of the product is displayed on the TV video receiver.

30. The apparatus of claim 29, wherein linking the product metadata with the program via first linked metadata comprises:

tagging the product with a network;

tagging the product with the program belonging to the network; and tagging the product with one or more episodes in the program.

31. The apparatus of claim 30, wherein determining whether the sport is involved based on the program comprises:

determining whether the network, the program, or the one or more episodes is associated with the sport.

32. The apparatus of claim 30, wherein linking the product metadata with the cast, character, or crew via second linked metadata comprises performing one or more of:

tagging the product with one or more casts in the program or an episode in the one or more episodes:

tagging the product with one or more characters in the program or episode in the one or more episodes; and tagging the product with one or more crew members in the program or episode in the one or more episodes.

33. The apparatus of claim 32, wherein identifying the element of TV program contextual data for the TV program comprises:

receiving one or more of the one or more casts, the one or more characters, and the one or more crew members; and identifying the product via the second linked metadata.

34. The apparatus of claim 30, wherein linking the product metadata with the cast, character, or crew via second linked metadata comprises:

tagging the product with one or more timecodes in the episode.

35. The apparatus of claim 30, wherein linking the product metadata with the team or player via third linked metadata comprises performing one or more of:

tagging the product with one or more leagues in a sport series;

tagging the product with one or more teams in the sport series; and tagging the product with one or more players in the sport series.

36. The apparatus of claim 35, wherein identifying the element of TV program contextual data for the TV program comprises:

receiving one or more of the one or more leagues, the one or more teams, and the one or more players; and identifying the product via the third linked metadata.

37. The apparatus of claim 30, wherein identifying the element of TV program contextual data for the TV program comprises:
- receiving one or more of the network, the program, and the one or more episodes; and
- identifying the product via the first linked metadata.

38. The apparatus of claim 29, wherein widget comprises a TV overlay.

39. The apparatus of claim 29, further comprising:
- receiving a selection of the product for purchase; and
- processing the purchase.

40. The apparatus of claim 39, wherein processing the purchase comprises:
- receiving a quantity of the product to be purchased;
- receiving selected options for the product from the TV viewer;
- receiving TV viewer account information; and
- receiving a checkout request from the TV viewer.

41. The apparatus of claim 39, wherein receiving the selection comprises:
- receiving the selection from a mobile telephone link responsive to texting instructions received from the TV viewer over a mobile telephone.

42. The apparatus of claim 39, wherein receiving the selection comprises:
- receiving the selection from a remote control for the set-top box or the TV.

\* \* \* \* \*